United States Patent [19]
Jeng

[11] Patent Number: 5,356,216
[45] Date of Patent: Oct. 18, 1994

[54] APPARATUS FOR MEASURING HEAT OF CIRCUIT MODULE

[75] Inventor: Jian-Dih Jeng, Hsinchu, Taiwan

[73] Assignee: Industrial Technology Research Institute, Hsinchu, Taiwan

[21] Appl. No.: 55,568

[22] Filed: May 3, 1993

[51] Int. Cl.$^5$ .............................................. G01K 17/00
[52] U.S. Cl. ............................................ 374/31; 374/32
[58] Field of Search ...................... 374/29, 30, 31, 32

[56] References Cited

U.S. PATENT DOCUMENTS

| | | | |
|---|---|---|---|
| 3,142,983 | 8/1964 | Dudley et al. | 374/29 |
| 3,233,458 | 2/1966 | Vrolyk | 374/30 |
| 3,531,989 | 10/1970 | Wood | 374/29 |
| 4,345,844 | 8/1982 | BiRukoff | 374/31 |
| 4,553,852 | 11/1985 | Derderian et al. | 374/30 |
| 4,577,976 | 3/1986 | Hayashi et al. | 374/29 |
| 5,026,170 | 6/1991 | Noel et al. | 374/29 |

FOREIGN PATENT DOCUMENTS

| | | | |
|---|---|---|---|
| 0237899 | 7/1986 | Fed. Rep. of Germany | 374/29 |
| 0038534 | 2/1986 | Japan | 374/29 |
| 403225236 | 10/1991 | Japan | 374/29 |
| 0288356 | 12/1970 | U.S.S.R. | 374/29 |
| 0462095 | 2/1975 | U.S.S.R. | 374/29 |

Primary Examiner—Diego F. F. Gutierrez
Attorney, Agent, or Firm—George D. Saile; William S. Robertson

[57] ABSTRACT

Apparatus for measuring the heat produced by a circuit module that is mounted on a circuit board has a tubular housing of a thermally resistive material such as plastic that is adapted to be placed over the module so that substantially all of the heat from the module flows along the axis of the housing, A thermal resistance is located between two metal partitions in the housing. The temperature drop through the resistance is calculated from the temperatures of the two partitions and the heat is calculated from the temperature drop and the value thermal resistance, The apparatus is adapted to make good thermal contact with the top of the module and cooling apparatus is provided for cooling the upper one of the two partitions. The upper partition is adjustable to vary the length of the thermal resistance in order to keep the temperature drop around 2° C. for modules of different power ratings.

13 Claims, 1 Drawing Sheet

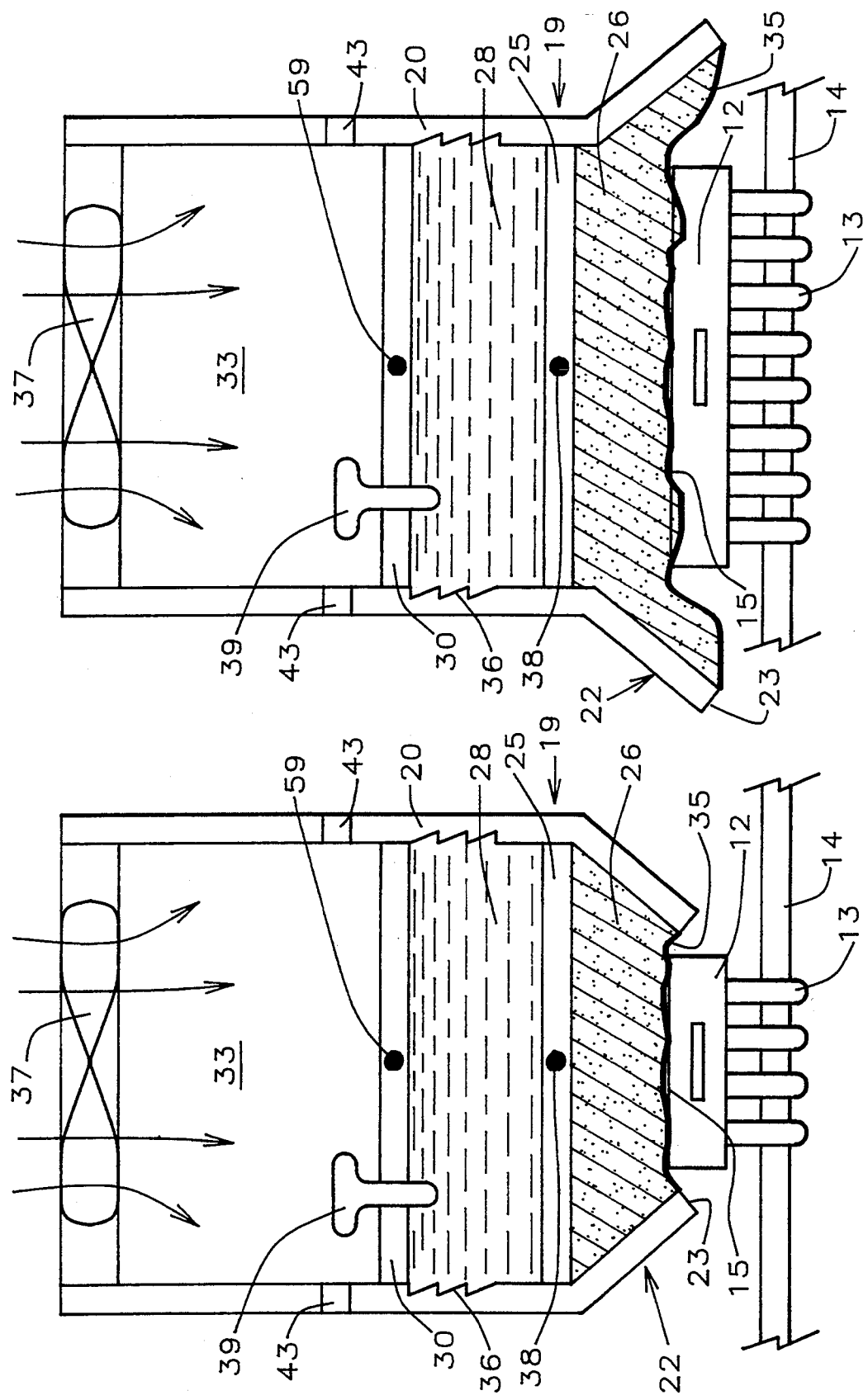

APPARATUS FOR MEASURING HEAT OF CIRCUIT MODULE

This invention relates to apparatus for measuring the heat produced by a circuit module.

Introduction

One object of this invention is to provide apparatus for measuring the heat produced by a circuit device such as a circuit module or a semiconductor chip. A circuit module produces heat from Ohmic losses according to the current it receives and its voltage drop.

At some stages of development and manufacture this power can be measured directly by measuring the voltage and current. However, when a circuit module is mounted on a multi-circuit module circuit board it is usually not feasible to measure the current.

SUMMARY OF THE INVENTION

A more specific object of this invention is to provide apparatus for measuring the heat produced by a module that is attached to a circuit board or is otherwise difficult to test if only electrical measurements are considered.

The tester has a tubular housing that fits over the module so that heat flows along the bore of the housing. A first and a second partition inside the housing define a chamber that holds a thermal resistance. The heat from the module produces a temperature drop across the resistance and this drop is measured by means of two temperature sensors such as thermocouples, one located in each of the two partitions.

The heat from the module can be calculated from the following equation, $$Q = IA\Delta T/\Delta L.$$

Q is the heat to be measured. K is a constant. The terms A and ΔL refer to the shape of the thermal resistance. The housing is preferably cylindrical in the region of the thermal resistance and the two partitions are circular and define a right cylinder having a base area A and a length ΔL. The term ΔT is the temperature drop measured at the two partitions. The test is made with a temperature drop of above 2° C.

After the circuit module has been operating for a while, its temperature becomes constant because the module dissipates power at exactly at the rate it is produced by ohmic losses. From the accuracy of thermocouples and the temperature drop above 2° C., the accuracy of the test is estimated at 90%.

Other objects and features of the invention will be apparent from the description of a preferred embodiment.

THE DRAWING

FIG. 1 is a section view showing the tester of this invention positioned to measure the heat from a circuit module.

FIG. 2 is similar to FIG. 1 and shows a tester that is adapted to measure the heat from a larger circuit module.

THE PREFERRED EMBODIMENT

Introduction—FIG. 1

FIG. 1 shows a semiconductor circuit module 12 with pins 13. The module is mounted on a circuit board 14 with a major heat dissipating surface 15 (the top of the module) facing outward from the board. The drawing is arbitrarily oriented with the circuit board in a horizontal plane and it will be convenient to describe the tester in this orientation. The tester is useful with modules mounted in various orientations and the terminology of the horizontal circuit board will be readily extended to the general case.

The Tester Structure—FIGS. 1 and 2

A tubular housing 19 is adapted to be positioned over the circuit module with the axis of the housing generally perpendicular to the plane of the circuit board. The housing is open at the top and bottom, and heat from the circuit module flows through the bore of the housing, as will be described. The housing wall 20 is made of a material such as plastic that is a poor heat conductor and the housing restricts the heat flow to a path through the housing. As will be explained, substantially all of the heat from the module flows through its surface 15 and through housing 19.

The circuit module is also cooled through other heat transfer paths, for example through the pins 13 to the board 14. In some circumstances this cooling is not of interest to the people who will use this apparatus, and in other circumstances this additional cooling will be small enough to be ignored. Alternatively, users of this tester may be able to estimate these heat paths if this is significant.

The housing is preferably cylindrical and has a uniform diameter over most or all of its length that is appropriate for the heat transfer characteristics that will be described later. The lower part 22 of the housing has a shape to fit over the circuit module 12 to direct the heat into the housing, and in the embodiment of FIG. 1 this part is funnel-shaped to bring the lower edge 23 of the housing close to the sides of the module to fit around a circuit device that is smaller than the bore of the tube in the region of the second chamber. The housing of FIG. 2 has a flared lower part 22 that adapts the tester to to fit around a circuit device that is larger than the bore of the tube in the region of the second chamber. The housing can have straight walls (not funnel-shaped and not flared).

A first horizontal partition 25 of a material of high thermal conductivity is located inside the housing to form the top of a first chamber 26 and the bottom of a second chamber 28. A similar second horizontal partition 30 of material of a high thermal conductivity is located inside the housing to form the top of the second chamber 28 and the bottom of a third chamber 33.

The first (lower) chamber 26

This chamber has means for establishing a good thermal path between the outer surface 15 of the circuit module and the lower surface of the first partition 25. Preferably, a first thermally conductive material is located in the lower chamber 26 to conduct heat from the circuit module to the first thermally conductive partition 25 with only a low temperature drop. Preferably a thermal grease forms this path, but heat transfer from a circuit module is a common problem, and various materials (oil, helium) and other apparatus (springs) are known for this purpose.

Commonly a thermal grease requires a containing barrier, and a thin film 35 of a material such as polyvinalchloride plastic forms the bottom of the first chamber 26. (The barrier material is not necessarily a good heat conductor, but it is made thin to adapt readily to the surface of the circuit module and does not produce an appreciable temperature drop.)

The thermal grease layer is about 5-10 mm in thickness; these details in the use of these materials are well known.

The second chamber 28

A second thermally conductive material fills the second chamber 28. This material has suitable properties to form a thermal resistance (equivalently called a thermal conductance) that produces a definite temperature drop for a definite heat flow through this chamber. Water is a suitable material because it does not change phase at the test temperature and its thermal resistance is linear with respect to temperature in the range of test temperatures. Helium is another suitable material and is used in some circuit modules. It is a good thermal conductor and it is chemically inert.

The function of this material in a test, will be described after the rest of the structure has been described.

The Module Cooling Apparatus

Preferably, a cooling apparatus is located above the second partition 30, and preferably the housing extends above the second partition to support the cooling apparatus. In the apparatus of FIG. 1, an electrical fan 37 is located at the top for blowing cooling air against the upper surface of the second partition. Exhaust openings 43 are located in the side of the tube to exhaust the heated air.

The Temperature Sensors

A first temperature sensing element 38 is located to measure the temperature of the first partition and a second temperature sensing element 59 is located to measure the temperature of the second partition. Conventional metals (e.g. aluminum) have a sufficiently low thermal resistance that each partition quickly comes to a uniform temperature across a partition of a thickness that is suitable for its mechanical properties. The temperature of the sensor is substantially the same as the temperature of the associated partition. The preferred temperature sensing elements are thermocouples.

Making the Test

The tester is placed over the circuit device as shown in the drawing, and the device being tested is operated for a sufficient time to reach a stable temperature. This time may be on the order of 30 minutes.

The good heat conductivity of the partitions 25 and 30 causes each of them to come to a uniform temperature during the operation of the tester. There is substantially no temperature drop across either partition in the axial direction, and the temperature is substantially uniform for each partition along a radius.

Note that the temperature of the circuit module does not affect the temperature calculation (because the thermal resistance is substantially linear). However, the test is conducted at a temperature that could not damage the module or otherwise affect the interpretation of the test results. Ordinarily the module temperature is reduced somewhat during the test. If the temperature rises undesirably (as indicated by the thermocouples), a tester with a larger fan can be substituted, the fan speed can be increased or the measurement can simply be interrupted.

The calculations for finding the module heat as a function of the temperature difference can be performed by hand or the temperature sensors can be connected to provide signals to a data processing system that performs the calculation. Programming the calculation is straight forward from the equation. The apparatus can be calibrated by measuring the first and second temperatures while testing a known heat source.

The Thermal Resistance Adjustment

The second (upper) partition is adjustable to control the length (and volume) of the second chamber 28. Threads 36 are formed in the inside surface of housing wall 20 and the corresponding edge of the second partition 30, and the partition can be raised and lowered. A filler hole is provided in the second partition for filling (or removing) the thermal resistance material. A plug 39 is provided to seal the filler hole. Preferably the filler plug 39 is a plastic bolt. The filler plug forms a convenient means for turning the upper partition to adjust the length of the second chamber; other suitable means will be readily apparent.

Other Embodiments

Those skilled in the art will find suitable modifications for specific applications of this tester, within the spirit of the invention and the intended scope of the claims.

We claim:

1. Testing apparatus for measuring the heat of a circuit module mounted on a circuit board, the board having a planar surface that defines a plane for the orientation of the circuit module, the circuit module having a major heat dissipating surface facing outward from the board the apparatus comprising, a tubular housing having a central axis and having a shape to be positioned over the circuit module with the axis of the housing generally perpendicular to the plane of the board, whereby a thermal path is formed through the axis of the housing for substantially all of the heat from the module surface, a first horizontal partition of high thermal conductivity located inside the housing at a position spaced from the heat dissipating surface to form a top of a first chamber that is open to receive the circuit module and forming a bottom of a second chamber, a second horizontal partition of high thermal conductivity located inside the housing to form a top of the second chamber, and a bottom of a third chamber, means in the first chamber for making a good thermal path between the circuit module and the first horizontal partition, a second thermally conductive material having a predetermined thermal resistance filling the second chamber, whereby a temperature drop will be produced between the first and second partitions according to a heat flow through the housing, an electric fan located above the second partition for blowing cooling air against the upper surface of the second partition means for measuring the temperature drop through the thermal resistance of the second chamber, comprising a first temperature sensing element located to measure the temperature of the first partition and a second temperature sensing element located to measure the temperature of the second partition, the walls of the housing being poor heat conductors to restrict the thermal path to substantially said axis of the housing whereby the heat transferred from the circuit module can be calculated according to an equation relating the temperature drop across the thermally conductive material to the thermal resistance established by the material.

2. The testing apparatus of claim 1 wherein the housing extends above the second partition forming a support and the electrical fan is located inside the housing and above the second partition, and the housing above the second partition has exhaust openings to exhaust the air that is heated by the second partition.

3. The testing apparatus of claim 1 wherein the housing includes means for adjusting the axial position of the second partition and thereby adjusting the length of the second chamber and the thermal resistance of the second chamber.

4. The testing apparatus of claim 3 wherein the tubular housing has an inside wall and wherein the length adjusting means comprises threads in the inside wall of the tubular housing and complementary threads in the second partition for moving the second partition along the axis of the housing by turning the second partition.

5. The testing apparatus of claim 4 wherein the length controlling means includes a filler hole and a removable plug in the second partition for filling the second chamber.

6. The testing apparatus of claim 5 wherein the removable plug comprises a plastic bolt.

7. The testing apparatus of claim 1 wherein the housing extends above the second partition and the electrical fan is located above the second partition for blowing cooling air against an upper surface of the second partition, and wherein the apparatus includes means for adjusting the length of the second chamber and thereby adjusting the thermal resistance of the second chamber, said adjusting means comprising threads in an inside wall of the tubular housing and complementary threads in the second partition for moving the second partition along the axis of the housing by turning the second partition.

8. The testing apparatus of claim 7 wherein the tubular housing has a flaring lower wall to fit around a circuit device that is larger than the bore of the tube in the region of the second chamber.

9. The testing apparatus of claim 7 wherein the tubular housing has a funneled in lower wall to fit around a circuit device that is smaller than the bore of the tube in the region of the second chamber.

10. The testing apparatus of claim 7 wherein the walls are of substantially uniform diameter throughout their length.

11. The testing apparatus of claim 7 wherein the walls are made of plastic.

12. The testing apparatus of claim 7 wherein the means in the first chamber for making a good thermal path is a thermal grease.

13. The testing apparatus of claim 7 wherein the first and second partitions have a high thermal conductivity causing each partition to come to a uniform temperature during use of the apparatus.

* * * * *